Sept. 6, 1966 V. C. GILBERT 3,271,717
ELECTRICAL COIL CONSTRUCTION EMPLOYING PRESSURE
SENSITIVE ADHESIVE
Filed June 5, 1961 4 Sheets-Sheet 1
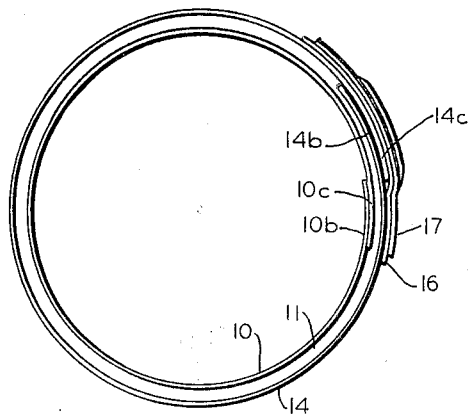
FIG_1
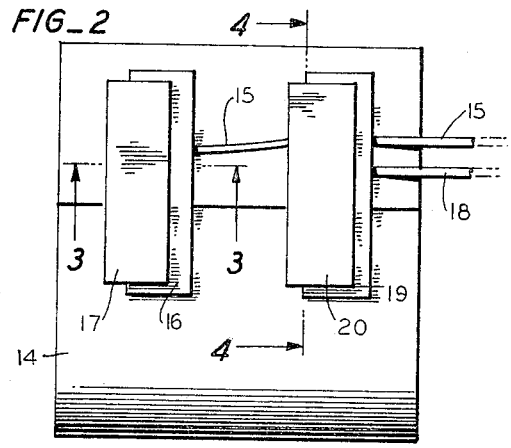
FIG_2
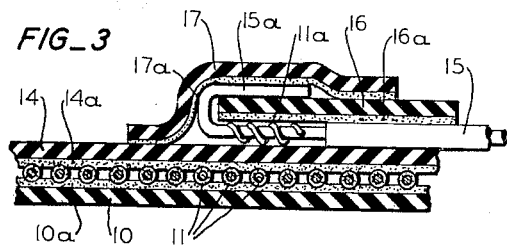
FIG_3
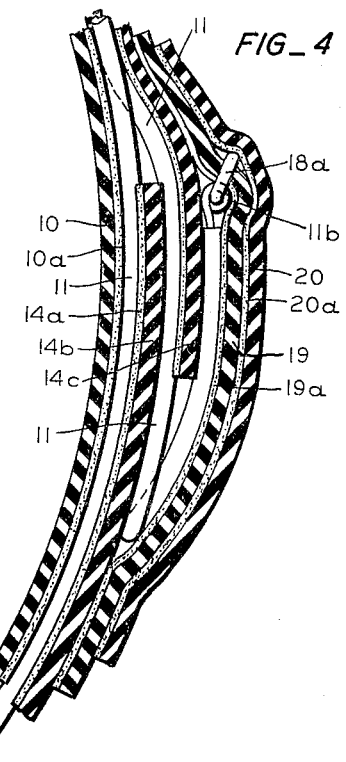
FIG_4
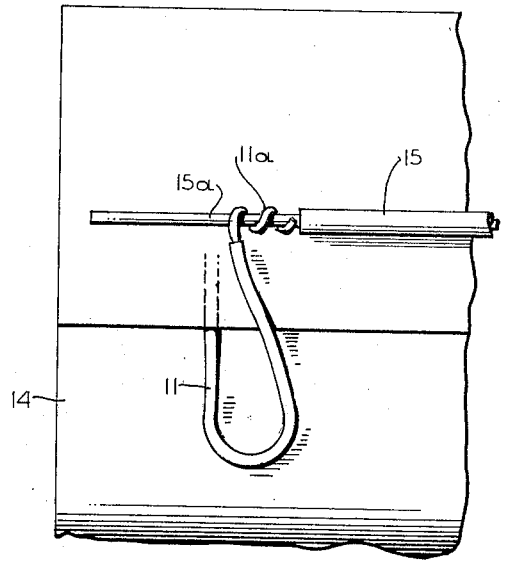
FIG_5
INVENTOR.
VINCENT C. GILBERT
BY
Allen and Chromy
ATTORNEYS Sept. 6, 1966 V. C. GILBERT 3,271,717
ELECTRICAL COIL CONSTRUCTION EMPLOYING PRESSURE
SENSITIVE ADHESIVE
Filed June 5, 1961 4 Sheets-Sheet 2
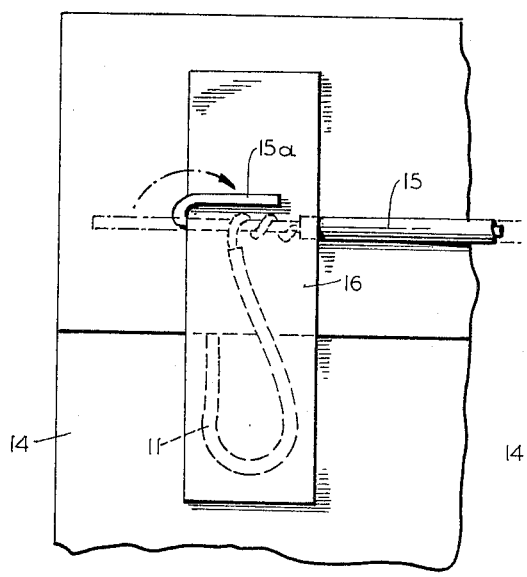
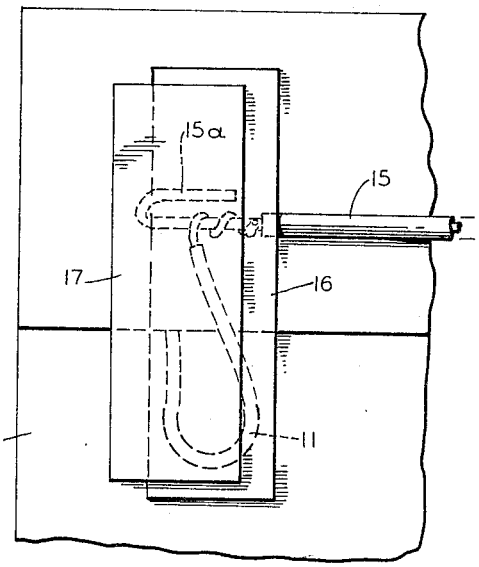
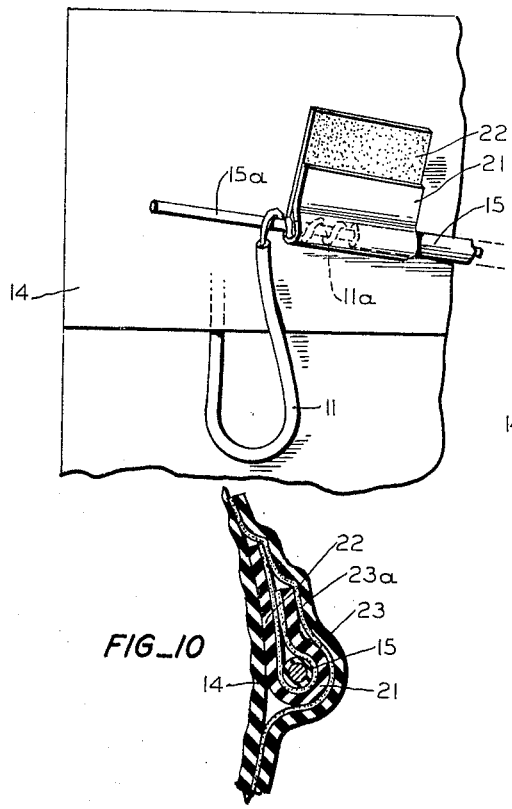
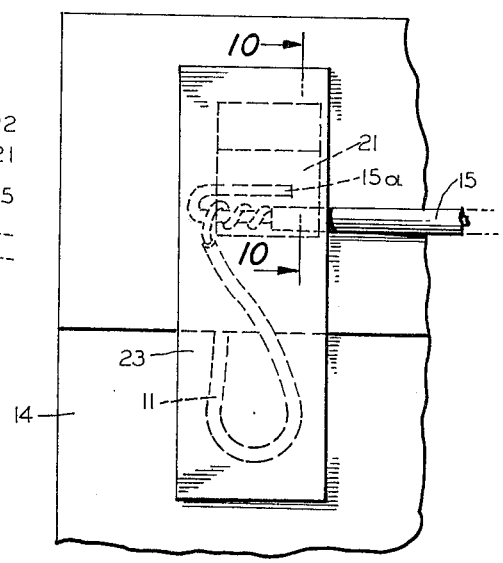
INVENTOR.
VINCENT C. GILBERT
BY Allen and Chromy
ATTORNEYS Sept. 6, 1966　　　　　　　V. C. GILBERT　　　　　　3,271,717
ELECTRICAL COIL CONSTRUCTION EMPLOYING PRESSURE
SENSITIVE ADHESIVE
Filed June 5, 1961　　　　　　　　　　　　　　　　4 Sheets-Sheet 3
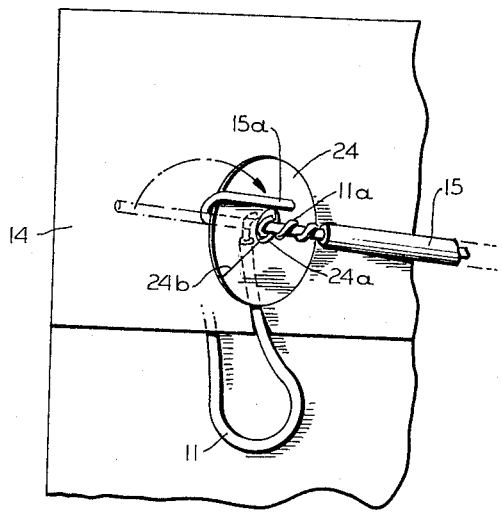
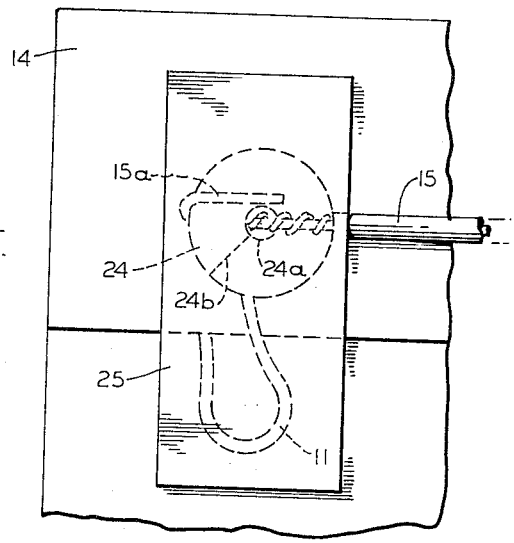
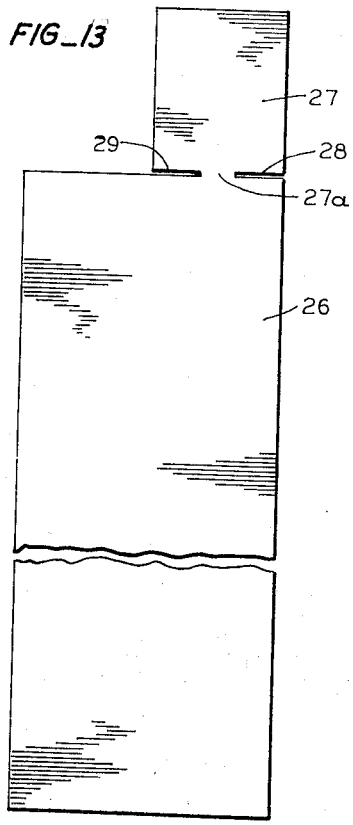
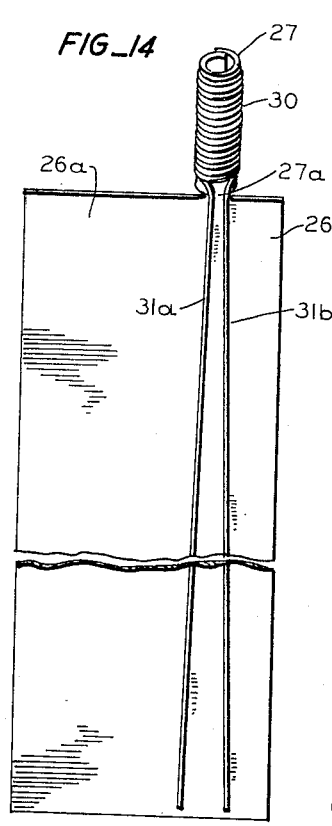
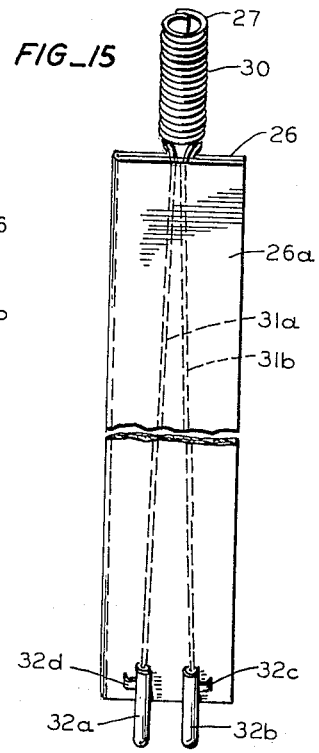
INVENTOR.
VINCENT C. GILBERT
BY
　　*Allen and Chromy*
　　　　AT TORNEYS

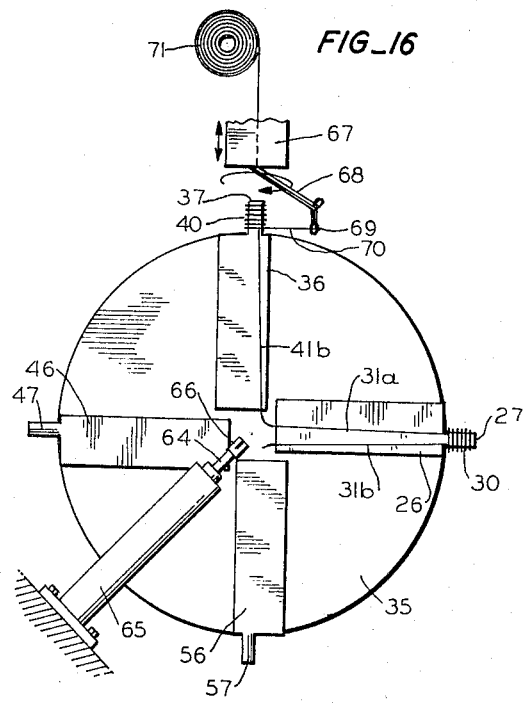
FIG_16
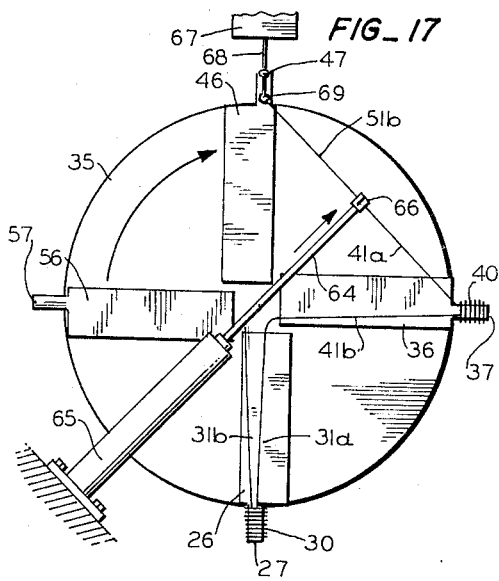
FIG_17
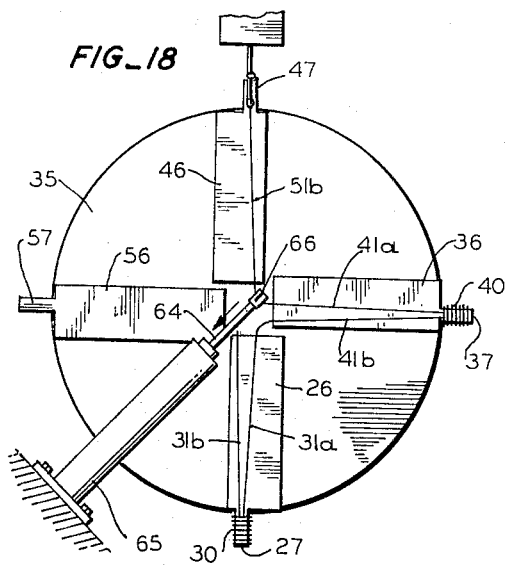
FIG_18
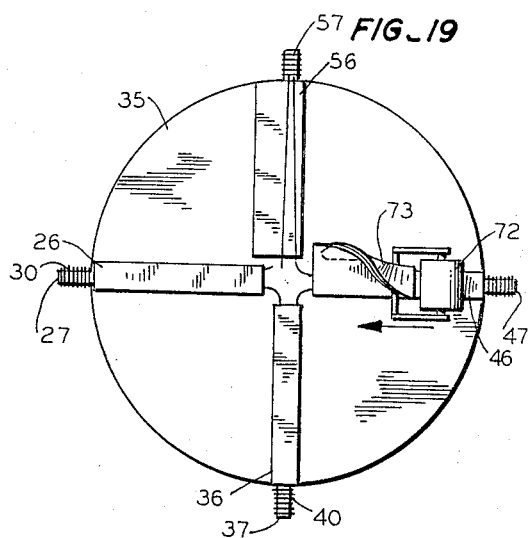
FIG_19
INVENTOR.
VINCENT C. GILBERT
BY
*Allen and Chromy*
ATTORNEYS

United States Patent Office 3,271,717
Patented Sept. 6, 1966

3,271,717
ELECTRICAL COIL CONSTRUCTION EMPLOYING PRESSURE SENSITIVE ADHESIVE
Vincent C. Gilbert, 16800 Quarry Road, Los Gatos, Calif.
Filed June 5, 1961, Ser. No. 114,684
13 Claims. (Cl. 336—192)

This invention relates to improvements in electrical coil constructions in general. More particularly, this invention relates to improvements in attaching leads to coils.

An object of this invention is to provide an improved electrical coil construction.

Still another object of this invention is to provide an improved electrical coil construction in which normal pulling force applied to the leads of the coil is kept from damaging the coil winding.

Another object of this invention is to provide an improved electrical coil construction whereby the leads are attached to the coil in such a manner that any normal pulling force applied to the leads is taken up by a protective structure and is not transmitted to the coil winding so as to damage said winding.

Still another object of this invention is to provide an improved method of electrical coil construction in which the coil leads are hooked under adhesive tape fasteners in such a manner that any normal pulling force applied to said leads is absorbed by said fasteners and is not transmitted to the coil winding.

Still another object of this invention is to provide an improved coil construction in which the ends of the coil leads are hooked under insulating covering of the coil so that normal force applied to these leads does not disturb the coil winding.

Still another object of this invention is to provide an improved coil construction in which the coil is wound around one end of an insulation form and the leads extending away from the coil are encased in another part of the insulation extending away from the coil form.

Still another object of this invention is to provide an improved coil construction adapted to coils wound with fine wire in which the coil leads are made out of the same kind of wire and extend away from the coil through a protective casing formed out of the same material as the coil form.

Other and further objects of this invention will be apparent to those skilled in the art to which it relates from the following specification, claims and drawings, in which briefly:

FIG. 1 is an end view of a coil made in accordance with this invention;

FIG. 2 is a side view of the coil shown in FIG. 1;

FIG. 3 is a sectional view taken along the line 3—3 of FIG. 2;

FIG. 4 is a sectional view taken along the line 4—4 of FIG. 2;

FIG. 5 is a detail view showing an end of a coil winding in the process of being attached to a lead wire;

FIG. 6 is a detail view showing an anchoring tab of pressure adhesive tape affixed over the looped end of the coil wire and the soldered lead connection with the end of the lead hooked over the outside of the tab;

FIG. 7 is a detail view similar to FIG. 6 with an additional tab of pressure adhesive tape applied over the hook formed in the end of the lead and over the previous tab;

FIG. 8 is a detail view of a part of a modified form of lead anchor;

FIG. 9 is a detail view of the complete lead anchor partially shown in FIG. 8;

FIG. 10 is a sectional view taken along the line 10—10 of FIG. 9;

FIG. 11 is a detail view of a part of another modified form of lead anchor;

FIG. 12 is a detail view of the complete lead anchor partially shown in FIG. 11;

FIG. 13 is a plan view of an insulation sheet from which a coil form and sheath for the coil leads are prepared in accordance with this invention;

FIG. 14 is a plan view similar to FIG. 13 showing the coil wound on the coil form part of the insulation sheet and showing the coil leads extending from the coil;

FIG. 15 is a plan view of the finished coil shown partially completed in FIG. 14;

FIG. 16 is a plan view of a turret type device for supporting a plurality of coil form sheets, such as shown in FIGS. 13 and 14, with a coil winding station positioned alongside of the turret winding a coil on one of the coil forms;

FIG. 17 is a view similar to FIG. 16 showing the coil lead placing mechanism extended to grip the coil wire preparatory to placing the leads on the insulation sheet;

FIG. 18 is a view similar to FIG. 17 with the lead placing mechanism retracted and the coil leads placed on the insulation sheet; and FIG. 19 is a view of the turret shown in FIGS. 16, 17 and 18 with all of the coils wound and with the lead sheath closing device in process of sealing one of the lead sheaths.

Referring to the drawing in detail, there is shown in FIG. 1 a coil embodying features of this, said coil is shown having circular configuration, although, of course, it may have a flat or any other configuration desired. The winding of the coil comprises a plurality of turns of wire 11, as shown in the sectional view FIG. 3, which are wound upon an insulation form 10 that is made up of a sheet of insulation material with overlapping end portions 10b and 10c. One surface of this sheet of insulation material is provided with a pressure-sensitive adhesive coating 10a on which the turns of wire 11 are wound and to which these turns adhere. The end portions 10b and 10c of the insulation material also are held together by this adhesive coating. Another layer of insulation material 14 is provided over the outside of the turns of wire 11 and this insulation sheet 14 is provided with a coating of pressure-sensitive adhesive 14a which contacts the turns of wire 11 on the opposite side thereof and to which these turns of wire also adhere, as shown in FIG. 3. While only one layer of turns of wire 11 is shown in FIG. 3, a plurality of such layers between insulation sheets may be provided, depending upon the number of turns of wire desired in the finished coil.

One end portion of the wire 11 is formed into a loop as shown in FIG. 5 and a short length 11a thereof is stripped of its insulation covering. This bare part of the wire 11 is wound around the bare end portion 15a of the lead wire 15 to make electrical contact therewith, and this connection is coated with solder if desired. Thereafter, a small tab 16, shown in FIG. 6, having an adhesive coating 16a on one side thereof is placed with the adhesive coating down upon the loop 11 of the wire, and over the joined portions 11a and 15a. The tab 16 is also pressed to adhere to the outside of the insulation 14 and it therefore fastens the loop of the wire 11, and the soldered joint between the end portion 11a and the portion 15a of the lead wire to the outside of the coil insulation 14. After the tab 16 is sealed to the outside of the insulation 14, the end portion 15a of the lead 15 is bent over the outside of the tab 16, as shown in FIGS. 3 and 6, so that this portion 15a forms a hook over the top of the tab 16 and any pull exerted on the lead 15 is transmitted to this hook and to the tab 16, instead of to the end of the winding. Another tab 17, which also has an adhesive coating on the bottom side thereof, is placed over the hook portion 15a of the lead 15 and over a part of the tab 16. The tab 17 extends beyond the hook 15a and is also attached with the adhesive thereof to the outside of the insulation 14, as shown in FIGS. 2 and 3, thereby strengthening the seal between the lead wire and the insulation covering 14 of the coil.

The other end of the winding is also provided with a loop similar to the loop shown in FIG. 5, and this other loop is connected to the lead wire 18 in the same manner as the end portion 11a of the wire shown in FIG. 5 is connected to the lead 15. Thereafter the tab 19 is placed over this other loop and connection and the end portion of the lead wire 18 is hooked over the side of the tab 19 in the same manner as the end portion 15a of the lead 15 is hooked over the tab 16, as shown in FIG. 3. An additional tab 20, which corresponds to the tab 17, is placed over the hook portion of the lead 18 in the same manner as shown in FIG. 4.

A modified form of this invention is shown in FIGS. 8, 9 and 10 in which a tab of insulation material 21, having an adhesive coating 22, is wrapped around the soldered joint between the wire portion 11a and the lead portion 15a, and the adhesive coating of this tab is caused to firmly adhere to the end portion of the lead 15. Part of the adhesive coating 22 of this tab is thus left exposed, as shown in FIG. 8, and thereafter an additional tab 23 with the adhesive coating 23a thereof facing downward is placed over the loop in the wire 11 and over the tab 21 and exposed adhesive 22 thereof. This tab 23 extends beyond the tab 22 and also beyond the loop in the wire 11, as shown in FIG. 9, and the adhesive coating 23 thereof is pressed into firm engagement with the outside of the insulation 14, thus firmly anchoring the lead to the outside of the coil insulation.

A further modification of this invention is shown in FIGS. 11 and 12 in which a tab of circular configuration, having a hole 24a and a slit 24b extending from the outside of the tab to the hole, is provided for receiving the end portion of the lead 15 which, together with the wrapped around wire 11a and soldered joint, extend through this hole 24a, as shown in FIG. 11. The underside of the tab 24 is also provided with pressure sensitive adhesive if desired, and this adhesive is pressed into firm contact with the coil insulation 14. Thereafter the end portion 15a of the lead is hooked over the tab 24. Thereafter another tab 25 is pressed with the adhesive coating on the bottom side thereof into firm engagement with the loop portion of the wire 11 and with the top of the tab 24, as well as the hook portion of the lead 15, as shown in FIG. 12, so that this tab 25 effectively anchors the end of the lead down on the insulation 14 and prevents any normal pull on the lead from being transmitted to the loop 11 and turns of the coil.

In FIGS. 13, 14, 15 there is shown another embodiment of this invention in which an insulation sheet 26 of relatively narrow and somewhat elongated configuration is provided with integral end portion 27 which is adapted to be formed into a coil support. This coil support extends from one end of the sheet 26 and is attached thereto by a narrow portion 27a. The sides of the part 27 are separated from the sheet 26 by the slits 28 and 29 so that the part 27 may be coiled into a tubular form as shown in FIG. 14 and the wire turns 30 may be wrapped around this tubular form which acts as a support for said turns. Suitable adhesive may be applied to the overlapping side portions of the coil support 27 so that the ends thereof may be cemented together and the tubular shape thus retained during the coil winding operation. The end 31a of the bottom of the coil 30 forms one of the leads to the coil and is placed down the length of the insulation sheet 26 as shown in FIG. 14. The end 31b from the upper part of the coil forms the other lead of the coil and is brought down in similar fashion and laid alongside of but spaced from the other lead 31a. Thereafter the left-hand half of the insulation sheet 26 is folded over along the middle of the sheet so that the left-hand half 26a is overlying the right-hand half, as shown in FIG. 15. The insulation sheet 26 may have a suitable pressure sensitive adhesive applied to the upper surface thereof so that when the left-hand half 26a is folded over the right-hand half, the two halves may be sealed together with the leads 31a and 31b sealed therebetween. Suitable terminal 32a and 32b are then attached by soldering or otherwise to the wire leads 31a and 31b, respectively, to make electrical contact therewith and these terminals are provided with lugs 32d and 32c, respectively, which are riveted or otherwise attached to the insulation 26.

The coil construction shown in FIGS. 13, 14 and 15 may be produced by means of the apparatus shown in FIGS. 16, 17, 18 and 19. This apparatus is provided with a suitable turret or turntable 35 which may be rotated either manually or by means of a suitable motor (not shown). Four coil winding positions are shown on this turret although a greater or smaller number may be provided as desired, and each of these positions is provided with a sheet of insulating material such as the sheet shown in FIG. 13 with the coil support portion 27 thereof formed into a circular coil form which extends out beyond the periphery of the turret 35. Thus four coil forms 27, 37, 47 and 57 are positioned on the turntable 35 and these are atached to the sheets 26, 36, 46 and 56, respectively. These sheets may be held on to the turntable 35 by various conventional means such as a small amount of cement or suitable suction openings may be provided to the table underneath the sheets and suction applied thereto through the use of a vacuum pump or the like.

The coil 30 is wound on the form 27 by means of the winding mechanism including the motor 67 and flyer 68 which is provided with a loop 69 at the outer end thereof through which the wire 70 from the supply 71 passes. Thus at the beginning of the operation the coil form 27 was positioned adjacent to the winding motor 67 in the same position as the coil form 37 is shown in FIG. 16. The winding operation was started by drawing off a suitable length of wire from the reel 71 sufficient to form the coil lead 31b which extends substantially to the center of the turntable 35. After this length of lead wire was provided on the insulation sheet 26, the motor 67 was started and the flyer 68 with its loop 69 rotated around the coil form 37, while the motor 67 and its flyer 68 was traversed back and forth across the coil form 37 to provide the desired number of layers of wire winding around this form. After the desired winding was provided to the form 27 the turret 35 was rotated so that the coil form 37 was positioned opposite the coil winder. The piston rod 64 of the cylinder 65 was then forced outward by supplying compressed air to the left-hand end of the cylinder 65. This caused the hook 66 at the end of the piston rod 64 to catch the wire lead extending from the wound coil which has been turned a quarter of a turn from the winding mechanism, for example, as shown in FIG. 17. Compressed air was then supplied to the right-hand end of the cylinder 65 and the left-hand end is opened to the atmosphere so that the piston rod 64 was drawn back into the cylinder and pulled the hook and wire attached thereto towards the center of the turntable to occupy the position shown in FIG. 18, thus forming the second lead 41a of the previously wound coil 40 and the first lead 51a of the coil which is about to be wound on the form 47.

The turntable 35 is now in the position shown in FIG. 18 with the coil form 47 positioned opposite to the winding apprtus ready to receive the winding wire thereon. After the coils are wound on the forms 47 and 57 in the same manner as described in connection with the coils wound on the forms 27 and 37, they are ready for sealing of the leads between the sheet material as shown in FIG. 15. This may be accomplished either manually or by passing a suitable plow 73 underneath the flap portion 26a for folding this portion over the portion 26 of the insulation material while the portion 26 is still held down on the turret and then passing a pressure or heated roller 72 over the folded sheet material to seal the folded portions together either by heat or by means of pressure sensitive adhesive. The leads of the coils positioned on the turntable are sealed in between layers of insulation material one after another by the manual or mechanical operation of the sealing unit 72–73.

A cover of tape having an adhesive coating thereon, similar to the tape 14 shown in FIGS. 1 and 3 is also placed on the outsides of the coils 30, 40, 50 and 60 shown in FIG. 19 to protect the outsides of these coils. Also if desired the sheaths 26, 36, 46 and 56 may be made of two pieces of insulation material instead of one piece, and the outer sheath layer may be cemented to the layer that is supported on the turret 35, to seal the leads therebetween.

The various forms of this invention are primarily adapted to coils wound with very small coated magnet wire on the order of No. 30 A.W.G. and finer. Somewhat larger wire on the order of No. 22 to No. 28 A.W.G. is used for the leads on the coils shown in FIGS. 1 to 12 inclusive. The leads for the coils shown in FIGS. 13–19 inclusive are of course the same size wire as that used to wind the coil which is wound with coated magnet wire as set forth above.

While I have shown a preferred embodiment of the invention, it will be understood that the invention is capable of variation and modification from the form shown so that its scope should be limited only by the scope of the claims appended hereto.

What I claim is:

1. An electrical coil comprising two sheets of dielectric material each having an adhesive on one face thereof with the adhesive faces being in opposed relationship, a wire wound between the sheets and embedded in each of the adhesive faces to maintain the wire in the assembled relationship relative to the sheets, one of said sheets serving as a form upon which the wire is wound with the second sheet comprising a cover for the wound wire and wherein the adhesive on each sheet is a pressure sensitive adhesive, the wire having ends, the ends of the wire extending outwardly of said sheets, lead wires connected to the extended wires, and means covering and sealing the connection.

2. An electrical coil as set forth in claim 1 wherein the wire wound between sheets is a coated magnet wire of a size of the order of No. 30 and finer.

3. An electrical coil comprising a first sheet of dielectric material having a pressure sensitive adhesive surface on one face thereof, the first sheet comprising a form, a wire wound upon the form and adhered to the adhesive surface, a second sheet of dielectric material having a pressure sensitive adhesive surface on one face thereof and comprising a cover for the wire with the wire adhered to the adhesive of the second sheet, the wire having an extending portion extending beyond the cover in the direction parallel to the turns of the wire, the extending portion having a strain loop therein, the end of the loop being wrapped around, a lead wire extending transverse of the turns, the wrapping in the extending wire comprising the connection between the extending wire and the lead wire, a hook in the lead wire at the point of connection, a first tab of dielectric material having an adhesive surface on one face thereof adhering to the cover and covering at least a portion of the connection, the hook engaging a portion of the first tab, and a second tab of dielectric material having an adhesive surface on one face thereof covering the hook, the remainder of the connection and at least a portion of the first tab and adhering thereto.

4. An electrical coil as set forth in claim 3 wherein the wire wound between sheets is a coated magnet wire of a size of the order of No. 30 and finer.

5. An electrical coil as set forth in claim 1 wherein the wire extends outwardly of the cover in a direction parallel to the turns of the wire while the lead wire is transverse the direction of the turns.

6. An electrical coil as set forth in claim 5 wherein the extended wire is wrapped around the lead wire adjacent the end of the extended wire, the lead wire having a hook therein at the point of wrapping.

7. An electrical coil as set forth in claim 6 wherein the means covering and sealing the connection is a first tab of dielectric material having an adhesive surface thereon covering at least a portion of the connection between the extending wire and the lead wire and adhering thereto and to one of the sheets and a second tab of dielectric material having an adhesive surface thereon covering at least a portion of the first tab and the remainder of the connection.

8. An electrical coil as set forth in claim 5 wherein the extending wire has a strain loop therein and a coil adjacent the end thereof, the coil forming the connection with the lead wire and the lead wire having a hook therein at the point of connection.

9. An electrical coil as set forth in claim 8 wherein the means covering and sealing the connection comprises a first tab of dielectric material having an adhesive surface thereon adhering to at least a portion of the connection and the cover, the first tab having a portion thereof engaging the hook of the lead wire, and a second tab of dielectric material having an adhesive surface thereon covering at least a portion of the first tab, the hook and the remainder of the connection.

10. An electrical coil as set forth in claim 3 wherein the first tab is rectangular in shape and overlies the cover in a direction parallel to the turn of the wire and thus being transverse the direction of pull of the lead wire.

11. An electrical coil as set forth in claim 3 wherein the first tab is rectangular in shape and wrapped around the connection between the extending portion of the wound wire and the lead wire and having an extended portion of the tab with the adhesive surface upward and the second tab completely covers the first tab, the strain loop, and the hook, and adheres to the tab and cover.

12. An electrical coil as set forth in claim 3 wherein the first tab is of disc shape having an opening in the center thereof and an outer rim, the coil of the wound wire and the end of the lead wire extending through the opening and the hook engaging a portion of the rim, the second tab completely covering the strain loop, the hook, and the connection, and adhering to the first tab and cover.

13. An electrical coil as set forth in claim 1 wherein the one of the sheets has an extending portion larger than the sheet and integral therewith, the extending portion having an adhesive surface thereon, the extending portion being folded upon itself and covering the extending wires and the connection.

References Cited by the Examiner

UNITED STATES PATENTS

| | | | |
|---|---|---|---|
| 2,159,269 | 5/1939 | Hasse | 336—192 X |
| 2,184,272 | 12/1939 | Driftmeyer | 336—192 |
| 2,275,967 | 3/1942 | Keillor et al. | 336—192 X |
| 2,875,420 | 2/1959 | Hofer et al. | 336—192 |
| 2,961,747 | 11/1960 | Lyman | 29—155.57 |
| 2,985,950 | 5/1961 | Duman | 29—155.57 |
| 2,999,990 | 9/1961 | Zack | 336—192 |
| 3,014,564 | 6/1962 | Peterson | 336—192 |
| 3,071,845 | 1/1963 | Leonard et al. | 336—60 X |

LARAMIE E. ASKIN, *Primary Examiner.*

JOHN F. BURNS, *Examiner.*

W. M. ASBURY, *Assistant Examiner.*